(12) United States Patent
Ratte

(10) Patent No.: US 8,512,891 B2
(45) Date of Patent: *Aug. 20, 2013

(54) MULTIPLE CASTING APPARATUS AND METHOD

(75) Inventor: Robert W. Ratte, North Oaks, MN (US)

(73) Assignee: Water Gremlin Company, White Bear Lake, MN (US)

(*) Notice: Subject to any disclaimer, the term of this patent is extended or adjusted under 35 U.S.C. 154(b) by 344 days.

This patent is subject to a terminal disclaimer.

(21) Appl. No.: 12/470,363

(22) Filed: May 21, 2009

(65) Prior Publication Data

US 2009/0229781 A1    Sep. 17, 2009

Related U.S. Application Data

(60) Continuation of application No. 11/709,365, filed on Feb. 22, 2007, now abandoned, which is a continuation of application No. 11/058,625, filed on Feb. 15, 2005, now abandoned, which is a division of application No. 10/683,042, filed on Oct. 9, 2003, now Pat. No. 6,866,087, which is a division of application No. 10/112,999, filed on Mar. 29, 2002, now Pat. No. 6,701,998.

(51) Int. Cl.
    *H01M 6/00*    (2006.01)
(52) U.S. Cl.
    USPC .............................. 429/122; 164/320; 164/98
(58) Field of Classification Search
    USPC ............................ 429/163, 122; 164/320, 98
    See application file for complete search history.

(56) References Cited

U.S. PATENT DOCUMENTS

| | | | |
|---|---|---|---|
| 1,248,768 | A | 12/1917 | Willard |
| 1,326,936 | A | 1/1920 | Jeans et al. |
| 1,411,414 | A | 4/1922 | Cook |
| 1,947,158 | A | 2/1934 | Henry |
| 1,982,801 | A | 12/1934 | Gerking |
| 1,983,618 | A | 12/1934 | Lamond |

(Continued)

FOREIGN PATENT DOCUMENTS

| | | |
|---|---|---|
| CA | 645083 | 7/1962 |
| CA | 2103759 | 3/1994 |

(Continued)

OTHER PUBLICATIONS

U.S. Appl. No. 11/709,365, filed Feb. 22, 2007, Ratte.

(Continued)

*Primary Examiner* — Jane Rhee
(74) *Attorney, Agent, or Firm* — Perkins Coie LLP

(57) ABSTRACT

An apparatus and method for pressure casting a battery part wherein an extendible piston includes sidewalls for shutting off the supply of molten lead and an impact surface that extends in a side-to-side condition to form an end surface of a battery part cavity so that when the extendible piston is brought into an intensifying condition the extendible piston shuts off further supply of molten metal while a heat source maintains the lead in a molten state as the impact surface of the piston forms a side-to-side mold cavity surface to complete the mold cavity surface thereby eliminating unevenness in the surface of the finished battery part by generating a force with the extendible piston which is sufficient to form a battery part so that upon removal from the mold the batter part is substantially free of tears and cracks as well as surface irregularities.

21 Claims, 3 Drawing Sheets

(56) References Cited

U.S. PATENT DOCUMENTS

| | | |
|---|---|---|
| 2,100,333 A | 11/1937 | Hess |
| 2,500,556 A | 3/1950 | Mallach |
| 2,510,100 A | 6/1950 | Goss |
| 2,599,706 A | 6/1952 | Friedman |
| 2,678,960 A | 5/1954 | Jensen |
| 2,901,527 A | 8/1959 | Mocas |
| 3,096,579 A | 7/1963 | Waller |
| 3,101,534 A | 8/1963 | Lange |
| 3,113,892 A | 12/1963 | Albrecht |
| 3,186,209 A | 6/1965 | Friedman |
| 3,280,613 A | 10/1966 | Schrom |
| 3,292,218 A | 12/1966 | Kozma, Jr. |
| 3,344,848 A | 10/1967 | Hall et al. |
| 3,381,515 A | 5/1968 | Orloff |
| 3,534,802 A | 10/1970 | Carr |
| 3,554,272 A | 1/1971 | Lauth |
| 3,736,642 A | 6/1973 | Miller et al. |
| 3,744,112 A | 7/1973 | Lindenberg et al. |
| 3,793,086 A | 2/1974 | Badger |
| 3,808,663 A | 5/1974 | McLane |
| 3,835,686 A | 9/1974 | Lawson et al. |
| 3,842,646 A | 10/1974 | Kuhn |
| 3,847,118 A | 11/1974 | Ambry |
| 3,945,097 A | 3/1976 | Daniels, Jr. et al. |
| 3,945,428 A | 3/1976 | Yanagisawa et al. |
| 3,947,936 A | 4/1976 | Wheadon |
| 3,992,759 A | 11/1976 | Farmer |
| 4,041,755 A | 8/1977 | Rut |
| 4,049,040 A | 9/1977 | Lynch |
| 4,062,613 A | 12/1977 | Tritenne |
| 4,083,478 A | 4/1978 | McLane |
| 4,100,674 A | 7/1978 | Tiegel |
| 4,146,771 A | 3/1979 | Tiegel |
| 4,160,309 A | 7/1979 | Scholle |
| 4,168,618 A | 9/1979 | Saier et al. |
| 4,177,551 A | 12/1979 | Johnson et al. |
| 4,212,934 A | 7/1980 | Salamon et al. |
| 4,266,597 A | 5/1981 | Eberle |
| 4,284,122 A | 8/1981 | Oxenreider et al. |
| 4,291,568 A | 9/1981 | Stifano, Jr. |
| 4,352,283 A | 10/1982 | Bailey |
| 4,362,043 A | 12/1982 | Hanson |
| 4,377,197 A | 3/1983 | Oxenreider et al. |
| 4,394,059 A | 7/1983 | Reynolds |
| 4,406,146 A | 9/1983 | Suzuki |
| 4,416,141 A | 11/1983 | Nippert |
| 4,422,236 A | 12/1983 | Ware, Jr. et al. |
| 4,423,617 A | 1/1984 | Nippert |
| 4,430,396 A | 2/1984 | Hayes, Jr. |
| 4,469,720 A | 9/1984 | Morris |
| 4,480,393 A | 11/1984 | Flink et al. |
| 4,495,260 A | 1/1985 | Hardigg et al. |
| 4,497,359 A | 2/1985 | Suzuki et al. |
| 4,505,307 A | 3/1985 | Uchida |
| 4,574,005 A | 3/1986 | Cobbs, Jr. et al. |
| 4,580,431 A | 4/1986 | Oku et al. |
| 4,592,405 A | 6/1986 | Allen |
| 4,600,608 A | 7/1986 | Ankrett |
| 4,610,581 A | 9/1986 | Heinlein |
| 4,614,630 A | 9/1986 | Pluim, Jr. |
| 4,662,205 A | 5/1987 | Ratte |
| 4,683,647 A | 8/1987 | Brecht et al. |
| 4,744,540 A | 5/1988 | Salamon et al. |
| 4,753,283 A | 6/1988 | Nakano |
| 4,775,604 A | 10/1988 | Dougherty et al. |
| 4,776,197 A | 10/1988 | Scott et al. |
| 4,779,443 A | 10/1988 | Hoshi |
| 4,779,665 A | 10/1988 | Ouimet |
| 4,835,711 A | 5/1989 | Hutchins et al. |
| 4,852,634 A | 8/1989 | Kawai et al. |
| 4,859,216 A | 8/1989 | Fritsch |
| 4,859,547 A | 8/1989 | Adams et al. |
| 4,874,032 A | 10/1989 | Hatamura |
| 4,879,191 A | 11/1989 | Sindorf |
| 4,938,276 A | 7/1990 | Noguchi et al. |
| 4,945,749 A | 8/1990 | Walker et al. |
| 4,967,827 A | 11/1990 | Campbell |
| 4,998,206 A | 3/1991 | Jones et al. |
| 5,016,460 A | 5/1991 | England et al. |
| 5,048,590 A * | 9/1991 | Carter .......................... 164/120 |
| 5,072,772 A | 12/1991 | Haehne |
| 5,074,352 A | 12/1991 | Suzuki |
| 5,077,892 A | 1/1992 | Nugent |
| 5,108,668 A | 4/1992 | Kallup |
| 5,125,450 A | 6/1992 | Kidd et al. |
| 5,143,141 A | 9/1992 | Frulla |
| 5,146,974 A | 9/1992 | Mayer et al. |
| 5,170,835 A | 12/1992 | Eberle et al. |
| 5,180,643 A | 1/1993 | Nedbal |
| 5,244,033 A | 9/1993 | Ueno |
| 5,273,845 A | 12/1993 | McHenry et al. |
| 5,290,646 A | 3/1994 | Asao et al. |
| 5,296,317 A | 3/1994 | Ratte et al. |
| 5,316,505 A | 5/1994 | Kipp |
| 5,326,655 A | 7/1994 | Mix et al. |
| 5,343,927 A | 9/1994 | Ivansson |
| 5,349,840 A | 9/1994 | Ratte et al. |
| 5,373,720 A | 12/1994 | Ratte et al. |
| 5,415,219 A | 5/1995 | Wiedenmann et al. |
| 5,422,202 A | 6/1995 | Spiegelberg et al. |
| 5,445,907 A | 8/1995 | Ito et al. |
| 5,458,032 A | 10/1995 | Spiegelberg |
| 5,499,449 A | 3/1996 | Carter et al. |
| 5,511,605 A | 4/1996 | Iwamoto |
| 5,580,685 A | 12/1996 | Schenk |
| 5,584,730 A | 12/1996 | Tabata et al. |
| 5,595,511 A | 1/1997 | Okada et al. |
| 5,606,887 A | 3/1997 | Spiegelberg et al. |
| 5,623,984 A | 4/1997 | Nozaki et al. |
| 5,632,173 A | 5/1997 | Spiegelberg et al. |
| 5,655,400 A | 8/1997 | Spiegelberg et al. |
| 5,663,015 A | 9/1997 | Hooke et al. |
| 5,671,797 A | 9/1997 | Nozaki et al. |
| 5,672,442 A | 9/1997 | Burnett |
| 5,686,202 A | 11/1997 | Hooke et al. |
| 5,704,119 A | 1/1998 | Ratte et al. |
| 5,709,967 A | 1/1998 | Larsen |
| 5,725,043 A | 3/1998 | Schaefer et al. |
| 5,730,203 A | 3/1998 | Mogensen |
| 5,746,267 A | 5/1998 | Yun et al. |
| 5,752,562 A | 5/1998 | Sparks |
| 5,758,711 A | 6/1998 | Ratte |
| 5,778,962 A | 7/1998 | Garza-Ondarza et al. |
| 5,785,110 A | 7/1998 | Guergov |
| 5,791,183 A | 8/1998 | Spiegelberg et al. |
| 5,814,421 A | 9/1998 | Spiegelberg et al. |
| 5,836,372 A | 11/1998 | Kono |
| 5,862,853 A | 1/1999 | Eliat |
| 5,887,641 A | 3/1999 | Iwamoto et al. |
| 5,908,065 A | 6/1999 | Chadwick et al. |
| 5,924,471 A | 7/1999 | Lund et al. |
| 6,001,506 A | 12/1999 | Timmons et al. |
| 6,030,723 A | 2/2000 | Nagano et al. |
| 6,033,801 A | 3/2000 | Casais |
| 6,082,937 A | 7/2000 | Ratte |
| 6,123,142 A | 9/2000 | Ratte |
| 6,152,785 A | 11/2000 | Haller et al. |
| 6,155,889 A | 12/2000 | Scarla et al. |
| 6,183,905 B1 | 2/2001 | Ling et al. |
| 6,202,733 B1 | 3/2001 | Ratte |
| 6,255,617 B1 | 7/2001 | Farmer et al. |
| 6,258,481 B1 | 7/2001 | Ross et al. |
| 6,267,171 B1 | 7/2001 | Onuki et al. |
| 6,363,996 B1 | 4/2002 | Ratte |
| 6,405,786 B1 | 6/2002 | Ratte |
| 6,499,530 B2 | 12/2002 | Ratte |
| 6,506,448 B1 | 1/2003 | Minogue |
| 6,513,570 B2 | 2/2003 | Ratte |
| 6,564,853 B1 | 5/2003 | Ratte |
| 6,598,658 B2 | 7/2003 | Ratte |
| 6,613,163 B1 | 9/2003 | Pfeifenbring et al. |
| 6,644,084 B1 | 11/2003 | Spiegelberg |
| 6,684,935 B2 | 2/2004 | Ratte |
| 6,701,998 B2 * | 3/2004 | Ratte .......................... 164/319 |

| | | | | | | | |
|---|---|---|---|---|---|---|---|
| 6,803,146 | B2 | 10/2004 | Key et al. | GB | 386159 | A | 1/1933 |
| 6,806,000 | B2 | 10/2004 | Misra et al. | GB | 1236495 | | 6/1971 |
| 6,830,490 | B2 | 12/2004 | Murakami et al. | GB | 1245255 | | 9/1971 |
| 6,864,015 | B2 | 3/2005 | Peterson et al. | GB | 1257963 | | 12/1971 |
| 6,866,087 | B2 | 3/2005 | Ratte | GB | 1352882 | | 5/1974 |
| 6,896,031 | B2 | 5/2005 | Ratte | GB | 2141654 | | 1/1985 |
| 6,902,095 | B2 | 6/2005 | Ratte et al. | GB | 2315695 | | 2/1998 |
| 6,908,640 | B2 | 6/2005 | Ratte et al. | JP | 54144931 | A | 11/1979 |
| 6,929,051 | B2 | 8/2005 | Peterson et al. | JP | 55057259 | | 4/1980 |
| 6,982,131 | B1 | 1/2006 | Hamada et al. | JP | 56159054 | | 12/1981 |
| 6,997,234 | B2 | 2/2006 | Peterson | JP | 56165359 | A | 12/1981 |
| 7,021,101 | B2 | 4/2006 | Spiegelberg | JP | 58209861 | A | 12/1983 |
| 7,070,441 | B1 | 7/2006 | Gregory et al. | JP | 59029357 | | 2/1984 |
| 7,074,516 | B2 | 7/2006 | Davidson et al. | JP | 61008846 | | 1/1986 |
| 7,163,763 | B2 | 1/2007 | Spiegelberg et al. | JP | 61096660 | | 5/1986 |
| 7,163,764 | B2 | 1/2007 | Ratte | JP | 61189860 | | 8/1986 |
| 7,246,650 | B2 | 7/2007 | Peterson | JP | 1124954 | | 5/1989 |
| 7,338,539 | B2 | 3/2008 | Ratte et al. | JP | 1239762 | | 9/1989 |
| 7,390,364 | B2 | 6/2008 | Ratte et al. | JP | 1243369 | | 9/1989 |
| 8,202,328 | B2 | 6/2012 | Ratte et al. | JP | 2155557 | | 6/1990 |
| 2001/0031394 | A1 | 10/2001 | Hansen et al. | JP | 2234347 | | 9/1990 |
| 2002/0002772 | A1 | 1/2002 | Hirano et al. | JP | 2247036 | A | 10/1990 |
| 2002/0114994 | A1 | 8/2002 | Yabuki et al. | JP | 3049152 | | 3/1991 |
| 2003/0017391 | A1 | 1/2003 | Peterson et al. | JP | 3263756 | | 11/1991 |
| 2003/0017392 | A1 | 1/2003 | Key et al. | JP | 4135042 | | 5/1992 |
| 2003/0207172 | A1 | 11/2003 | Misra et al. | JP | 4206459 | | 7/1992 |
| 2003/0224248 | A1 | 12/2003 | Spiegelberg et al. | JP | 4223047 | | 8/1992 |
| 2005/0042509 | A1 | 2/2005 | Key et al. | JP | 5283057 | | 10/1993 |
| 2005/0084751 | A1 | 4/2005 | Ratte | JP | 5325940 | | 12/1993 |
| 2005/0147881 | A1 | 7/2005 | Ratte et al. | JP | 6015402 | | 1/1994 |
| 2005/0147882 | A1 | 7/2005 | Ratte et al. | JP | 6020663 | | 1/1994 |
| 2005/0153202 | A1 | 7/2005 | Ratte et al. | JP | 6196136 | | 7/1994 |
| 2005/0155737 | A1 | 7/2005 | Ratte | JP | 6223812 | | 8/1994 |
| 2005/0238955 | A1 | 10/2005 | Hooke et al. | JP | 7211308 | | 8/1995 |
| 2006/0068279 | A1 | 3/2006 | Spiegelberg et al. | JP | 7211309 | | 8/1995 |
| 2006/0127693 | A1 | 6/2006 | Peslerbe et al. | JP | 7235286 | A | 9/1995 |
| 2008/0038633 | A1 | 2/2008 | Ratte et al. | JP | 8171897 | | 7/1996 |
| 2009/0047574 | A1 | 2/2009 | Hellmann | JP | 8273656 | | 10/1996 |
| 2009/0246618 | A1 | 10/2009 | Dirks | JP | 9045309 | | 2/1997 |
| 2010/0116455 | A1 | 5/2010 | Ratte et al. | JP | 9130460 | | 5/1997 |
| 2010/0291435 | A1 | 11/2010 | Garin et al. | JP | 9167610 | | 6/1997 |
| 2011/0045336 | A1 | 2/2011 | Ratte et al. | JP | 9237615 | | 9/1997 |
| | | | | JP | 9312151 | | 12/1997 |
| | | FOREIGN PATENT DOCUMENTS | | JP | 9320630 | | 12/1997 |
| | | | | JP | 10116602 | | 5/1998 |
| CA | | 2459031 | 3/1994 | JP | 10144289 | | 5/1998 |
| CA | | 2558525 | 4/2007 | JP | 10208714 | | 8/1998 |
| CH | | 321596 | 5/1957 | JP | 11045698 | | 2/1999 |
| CH | | 371154 | 8/1963 | JP | 11045699 | | 2/1999 |
| DE | | 523104 | 4/1931 | JP | 11135102 | | 5/1999 |
| DE | | 1146149 | 3/1963 | JP | 11176415 | | 7/1999 |
| DE | | 2645977 | 4/1978 | JP | 2000021367 | | 1/2000 |
| DE | | 134330 C | 2/1979 | JP | 2000164199 | | 6/2000 |
| DE | | 3132292 A1 | 3/1983 | JP | 2001256955 | A | 9/2001 |
| DE | | 3230628 | 12/1983 | JP | 2001307714 | | 11/2001 |
| DE | | 3401354 | 7/1985 | JP | 2001006655 | | 12/2001 |
| DE | | 3502675 | 7/1986 | JP | 2002025536 | | 1/2002 |
| DE | | 3942175 | 6/1991 | JP | 2002050327 | | 2/2002 |
| DE | | 4127956 | 2/1993 | JP | 2002175795 | | 6/2002 |
| DE | | 4241393 | 7/1994 | JP | 2002270150 | | 9/2002 |
| DE | | 19635075 A1 | 3/1998 | JP | 2003007281 | | 1/2003 |
| EP | | 0040951 | 12/1981 | JP | 2003242946 | | 8/2003 |
| EP | | 0117213 | 8/1984 | JP | 2003317677 | | 11/2003 |
| EP | | 0244683 | 11/1987 | JP | 2003317698 | | 11/2003 |
| EP | | 0261311 | 3/1988 | JP | 2003346777 | | 12/2003 |
| EP | | 0284068 A1 | 9/1988 | JP | 2003346778 | | 12/2003 |
| EP | | 0319128 | 6/1989 | JP | 2004039401 | | 2/2004 |
| EP | | 0344042 | 11/1989 | JP | 2004228013 | | 8/2004 |
| EP | | 0448792 A2 | 10/1991 | JP | 2004228046 | | 8/2004 |
| EP | | 0559920 | 9/1993 | JP | 2004235050 | | 8/2004 |
| EP | | 0590284 | 4/1994 | JP | 2004281145 | | 10/2004 |
| EP | | 0601268 | 6/1994 | JP | 2005078856 | | 3/2005 |
| EP | | 0633081 | 1/1995 | JP | 2005116243 | | 4/2005 |
| EP | | 0809327 | 11/1997 | JP | 2005116387 | | 4/2005 |
| EP | | 0878856 | 11/1998 | JP | 2005142009 | | 6/2005 |
| EP | | 0941554 | 9/1999 | JP | 2006331784 | | 12/2006 |
| EP | | 1291940 | 3/2003 | JP | 2007157611 | A | 6/2007 |
| ES | | 2097388 T3 | 4/1997 | KR | 3044813 | | 6/2003 |
| FR | | 2504424 | 10/1982 | SU | 688279 | A1 | 9/1979 |
| GB | | 297904 | 10/1928 | | | | |

| | | |
|---|---|---|
| WO | WO-9402272 A1 | 2/1994 |
| WO | WO-9907029 A1 | 2/1999 |
| WO | WO-2005067513 A2 | 7/2005 |
| WO | WO-2005119813 A2 | 12/2005 |
| WO | WO-2008032348 A1 | 3/2008 |
| WO | WO-2009142621 A1 | 11/2009 |
| WO | WO-2010033239 A1 | 3/2010 |
| WO | WO-2010127289 A1 | 11/2010 |

OTHER PUBLICATIONS

U.S. Appl. No. 12/029,447, filed Feb. 11, 2008, Ratte.
U.S. Appl. No. 12/533,413, filed Jul. 31, 2009, Ratte.
Colombian Examination Report; Colombian Patent Application No. 99065069; International Filing Date: Oct. 13, 1999; Applicant: Water Gremlin Co.; Mailing Date: Mar. 4, 2009.
European Search Report; European Patent Application No. 04816050; International Filing Date: Dec. 21, 2004; Applicant: Water Gremlin Co.; Mailing Date: Mar. 3, 2009.
Final Office Action, U.S. Appl. No. 11/058,625, Mailed on Mar. 6, 2006, 5 pages.
Final Office Action, U.S. Appl. No. 11/058,625, Mailed on Jul. 5, 2006, 6 pages.
Final Office Action, U.S. Appl. No. 11/709,365, Mailed on Nov. 21, 2008, 9 pages.
International Search Report and Written Opinion; International Patent Application No. PCT/US04/44071; Filed: Dec. 21, 2004; Applicant: Water Gremlin Company; Mailed on Dec. 22, 2005.
International Search Report and Written Opinion; International Patent Application No. PCT/US08/64161; Filed: May 19, 2008; Applicant: Ferrari, Paolo; Mailed on Aug. 15, 2008.
Non-Final Office Action, U.S. Appl. No. 11/011,362, Mailed on Dec. 5, 2008, 7 pages.
Non-Final Office Action, U.S. Appl. No. 11/058,625, Mailed on Nov. 2, 2005, 5 pages.
Non-Final Office Action, U.S. Appl. No. 11/058,625, Mailed on Nov. 30, 2006, 4 pages.
Non-Final Office Action, U.S. Appl. No. 11/709,365, Mailed on Oct. 31, 2007, 5 pages.
Non-Final Office Action; U.S. Appl. No. 11/076,559; Mailed on Oct. 17, 2008, 6 pages.
Final Office Action, U.S. Appl. No. 11/011,362, Mailed on Aug. 31, 2009, 11 pages.
Heller, Machine translation of EP 0601268—May 1993, EPO, 2 pages.
European Search Report; European Patent Application No. 03023874.5; Applicant: Water Gremlin Company; Mailing Date: Apr. 27, 2010.
International Search Report and Written Opinion; International Patent Application No. PCT/US2010/033239; Filed: Apr. 4, 2010; Applicant: Water Gremlin Company; Mailed on Sep. 7, 2010.
European Search Report; European Patent Application No. 10196207; Applicant: Water Gremlin Company; Mailing Date: Feb. 28, 2011.
Examination Report; European Patent Application No. 04816050.1; Applicant: Water Gremlin Company; Mailing Date: Jul. 14, 2009.
Examination Report; European Patent Application No. 10196207.4, Applicant: Water Gremlin Company; Mailing Date: Feb. 22, 2013.
Extended European Search Report; Application No. 08755902.7, mailed Nov. 27, 2012, 6 pages.
Final Office Action; U.S. Appl. No. 12/771,714; Mailed on Nov. 29, 2012; 11 pages.
Gould Drawing No. 8RD5538, "Cold Forged Positive Lead Terminal Bushing for Plastic Covers", Gould Auto. Div., St. Paul, Minn., May 3, 1974.
Gould Drawing No. 8RD5539, "Cold Forged Negative Lead Terminal Bushing for Plastic Covers", Gould Auto. Div., St. Paul, Minn., May 3, 1974.
HPM Corporation. HPM Tech Data-Thixomolding. Feb. 1992, 1 page, place of publication unknown.
HPM, Thixomolding Utilizes Injection Molding . . . Date unknown, 2 page advertisement, place of publication unknown.
International Search Report and Written Opinion; International Patent Application No. PCT/US2011/021571; Filed: Jan. 18, 2011; Applicant: Water Gremlin Company; Mailed on Mar. 21, 2011.
International Search Report and Written Opinion; International Patent Application No. PCT/US2011/028388 filed Mar. 14, 2011, Mailing Date: Jul. 26, 2011.
International Search Report and Written Opinion; International Patent Application No. PCT/US2011/028389 filed Mar. 14, 2011, Mailing Date: Aug. 25, 2011.
Lindberg Corporation. Hot Lines. Mar. 1993, vol. III, Issue 2, pp. 1-2, place of publication unknown. cited on U.S. Patent 5,758,711.
Lindberg Corporation. Hot Lines. Significant Developments from the Engineered Products Group: Equipment News. Date unknown, Issue 3, 3 pages, place of publication unknown. cited on U.S. Patent 5,758,711.
Lindberg Corporation. Press Release: Thixomolding Processes Establishes Production Benchmarks, 1993, 5 pages, Illinois.
Non-Final Office Action for U.S. Appl. No. 13/046,609, filed Mar. 11, 2011, mailed Feb. 27, 2013, 35 pages.
Non-Final Office Action; U.S. Appl. No. 12/533,413; Mailed on Jan. 28, 2013, 13 pages.
Non-Final Office Action; U.S. Appl. No. 12/533,413; Mailed on Jun. 19, 2012, 10 pages.
Non-Final Office Action; U.S. Appl. No. 12/771,714, mailed Jun. 28, 2012.
Notice of Allowance for U.S. Appl. No. 12/771,714, filed Apr. 30, 2010, mailed Mar. 26, 2013, 11 pages.

* cited by examiner

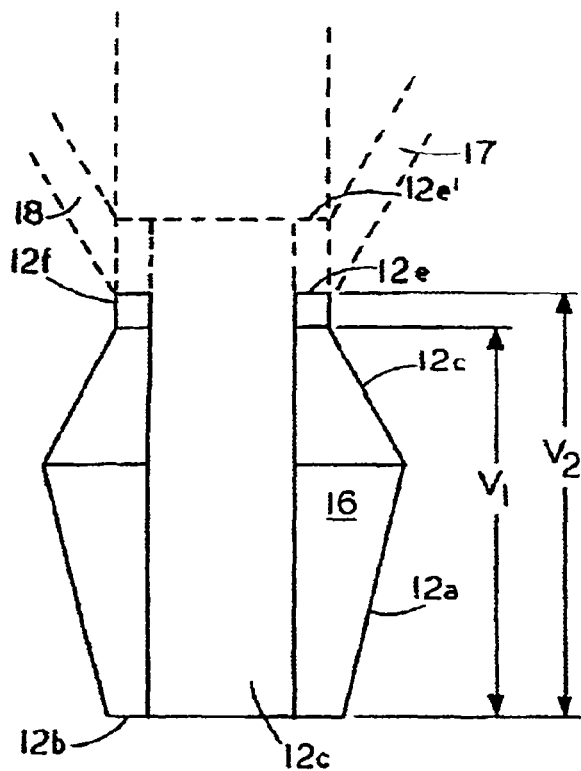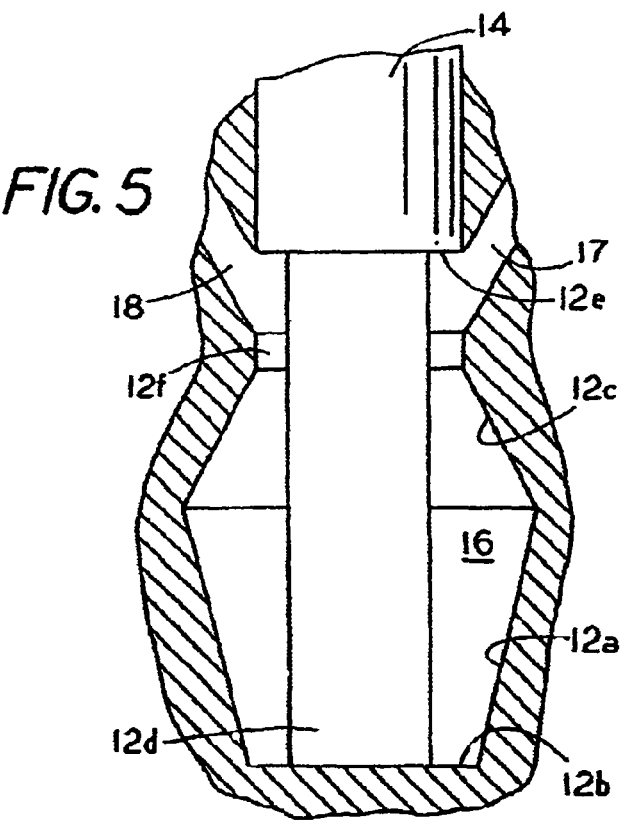

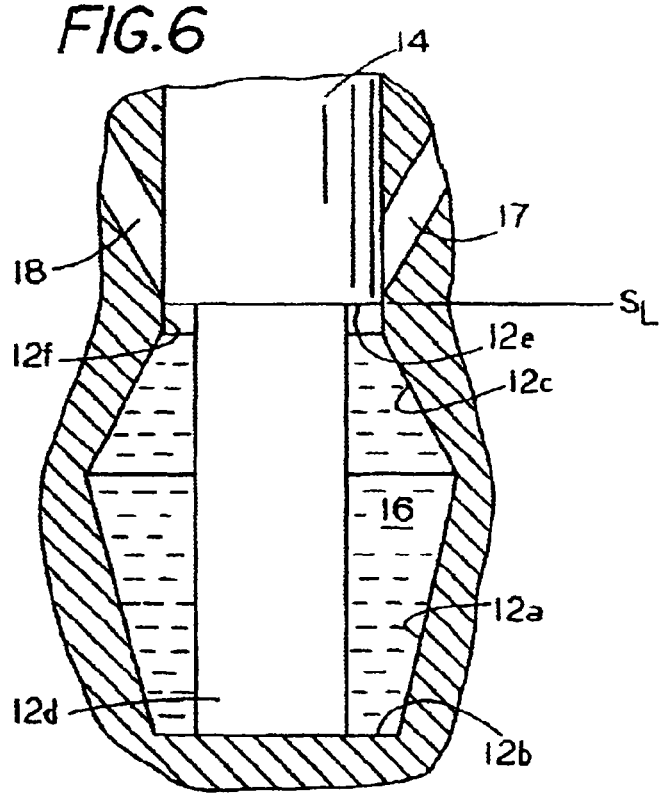
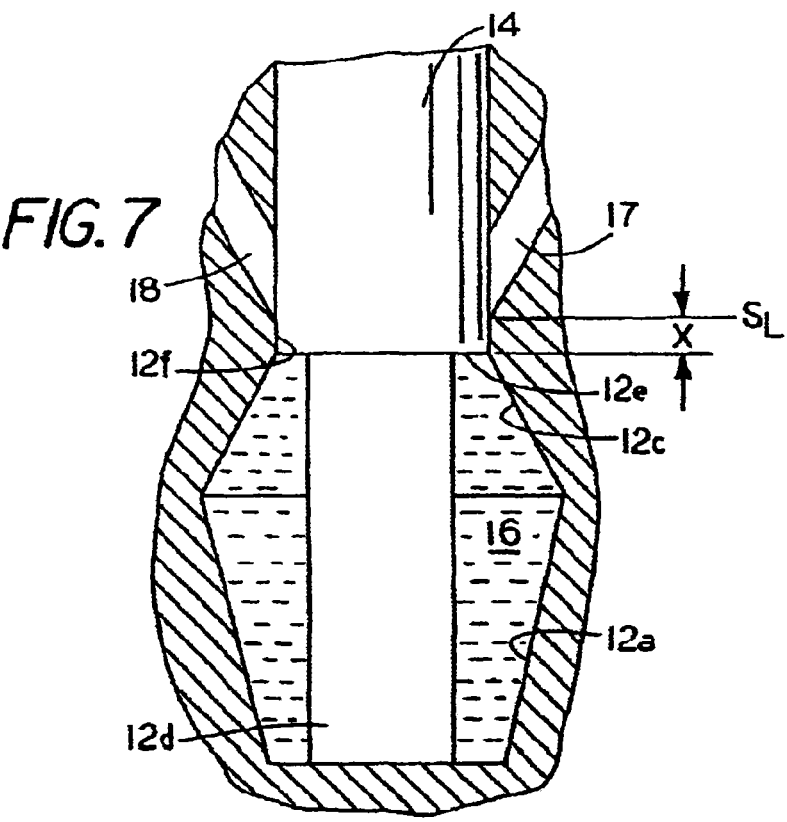

MULTIPLE CASTING APPARATUS AND METHOD

CROSS REFERENCE TO RELATED APPLICATIONS

The present application is a Continuation of U.S. Ser. No. 11/709,365, filed Feb. 22, 2007, now abandoned which is a continuation of U.S. Ser. No. 11/058,625, filed Feb. 15, 2005, now abandoned which is a divisional of U.S. Ser. No. 10/683,042, filed Oct. 9, 2003, now U.S. Pat. No. 6,866,087, which is a divisional of U.S. Ser. No. 10/112,999, filed Mar. 29, 2002, now U.S. Pat. No. 6,701,998. The disclosures of these applications are incorporated herein by reference in their entireties.

FIELD OF THE INVENTION

This invention relates generally to pressure casting and, more specifically to die casting of lead or lead alloy battery parts such as battery terminals to form a finished battery part while at the same time inhibiting the formation of cracks and tears during and after the solidification of the battery part through peripherally contracting the mold cavity volume by bringing an entire mold face toward a mold cavity to reduce the bounded surface volume of the mold cavity without disrupting the integrity of the faces of the mold part solidifying within the bounded surface volume.

STATEMENT REGARDING FEDERALLY SPONSORED RESEARCH OR DEVELOPMENT

None

REFERENCE TO A MICROFICHE APPENDIX

None

BACKGROUND OF THE INVENTION

Battery parts such as battery terminals, which are typically made of lead or a lead alloy, are usually cold formed in order to produce a battery terminal that is free of voids and cracks. If lead or lead alloy battery parts are pressure cast, air is left in the battery part cavity in the mold so that as the lead solidifies, the air bubbles prevent the battery part from cracking. That is, the air bubbles act as fillers so the lead remains distributed in a relatively uniform manner throughout the battery part. Unfortunately, air bubbles within the battery parts cause the battery parts to be rejects as the air bubbles can produce large voids in the battery part. In order to minimize the air bubbles in the battery part, a vacuum can be drawn in the battery part cavity mold; however, although the vacuum removes air from the mold and inhibits the forming of air bubbles in the battery part, the battery parts cast with a vacuum in the battery part cavity oftentimes solidify in an uneven manner producing battery parts with cracks or tears which make the battery parts unacceptable for use.

The process of pressure casting or die casting of battery parts wherein intensification of the battery part is used to form battery parts substantially free of cracks and tears is more fully described in my copending application Ser. No. 09/170,247, filed Oct. 13, 1998, titled Apparatus for and Method of Casting Battery parts; Ser. No. 09/458,198 filed Dec. 10, 1999 title Multiple Casting Apparatus and Method and Ser. No. 09/321,776 filed May 27, 1999 titled Apparatus and Method of Forming Battery Parts which are herein incorporated by reference.

In one such embodiment, a battery part is cast which is substantially free of cracks and tears by pressure casting a lead alloy while a vacuum is being applied to the battery part cavity. At the moment when the lead in the battery part cavity reaches the liquid-to-solid transformation stage, the part is intensified by driving a piston into the mold cavity to rapidly reduce the volume of the mold for solidification. By precisely controlling the time of application of an external compression force to the molten lead in the battery part cavity, and consequently, the time at which the volume of the battery part cavity is reduced, one can force the molten lead or lead alloy in the flowable state into a smaller volume where the pressure on the battery part cavity is maintained. By maintaining the pressure on the battery part cavity during the solidification process by intensification (driving a piston into the lead), the battery part can be cast in a form that is substantially free of cracks and tears.

In another embodiment, the mold for forming the pressure cast battery part is sealed off while the molten lead is still in the molten state and before the molten lead can begin to solidify the supply of pressurized lead is shut off and at the same time the internal pressure of the molten lead is increased by driving a piston into the molten metal. This intensification process is suited for those applications where the entire mold can withstand the higher pressures. That is, when the liquid metal is in a molten state an increase in pressure of the molten lead throughout the mold and the maintaining of the increased pressure during solidification can produce a battery part free of tears and cracks. This process of intensification by driving a piston into the mold allows one to obtain greater molding pressure than is available with conventional pressure casting techniques.

In another embodiment, the cast battery part is subjected to at least a partial cold forming during the volume contraction step by rapidly driving a piston into the solidified cast battery part with sufficient force to cold form a portion of the lead in the battery part to thereby produce a battery part that is free of cracks and tears. This method of partial cold form intensification is more suitable for those battery parts where one does not want to subject the mold to excessively higher pressures than the die casting pressures.

In the present invention a finished battery is die cast which is substantially free of cracks and tears is formed by extending a piston that first shutoffs the flow of molten lead into and out of the mold cavity. Further extension of the piston brings a piston face that forms a bounded end face of the mold part toward the other faces of the mold. Instead of driving a piston into the mold cavity to increase the pressure of the die cast battery part the entire mold face is brought toward the set of other mold faces to decrease the volume of the mold.

Thus the shutoff and intensification are accomplished by a single stroke of an extendible piston carrying a mold face thereon.

By finished surface it is meant that the surface of the battery does not contain flashing or irregularities where the molten lead was supplied through a gate. That is, in die casting the runner that supplies lead to the mold is usually broken off when the battery part is removed from the mold thus leaving an unfinished surface. Since irregularities can create problems in electrical operation of the battery part it is desired to have a smooth finished surface over the entire battery part. As pointed out, such finished surfaces are usually obtained only with cold forming a battery part. The present invention provides such a finished surface without having to cold form the battery part. In addition, one can also increase the pressure sufficiently to inhibit voids and cracks in the battery part.

In the present invention a retractable piston has an impact surface or mold face that forms an entire side-to-side mold face or mold surface of the battery part thereby eliminating the formation of a local irregularity in the portion of the surface of the battery part that would occur if the piston penetrated a portion a mold face i.e. breaking the surface plane of the mold cavity. The use of a side-to-side or bounded mold face that does not break the surface plane of the mold cavity substantially eliminates the need to finish the battery part. That is, once the part is removed from the mold it is ready for use since the surface plane of the mold cavity has not been broken or penetrated by the moving end face. In addition, since the entire side-to-side surface of the battery part is impacted the precision timing of the intensification step is eliminated. That is, since the intensification pressure is applied on a side-to-side portion of the battery part cavity the lead can be in either the liquid, solid or mush state since the all the lead can be confined and squeezed within the cavity of the battery part mold cavity.

SUMMARY OF THE INVENTION

An apparatus for pressure casting a battery part wherein a mold includes a set of faces to form a portion of a battery part mold cavity and an extendible piston having a battery part mold cavity face that extends in a side-to-side condition on the piston with the faces coacting to form a bounded battery part mold cavity. The piston includes sidewalls for shutting off the supply of molten lead to and from the mold cavity so that when the extendible piston is brought toward the battery part mold cavity the extendible piston first shuts off a further supply of molten metal to the battery part mold cavity as well as egress of metal from the battery part mold cavity to create a closed battery part mold cavity. The battery part mold cavity peripherally contracts as the face of the piston forms an entire bounded face of the battery part mold cavity. The peripherally contraction eliminates localized surface penetration of the face of a battery part as the peripheral surface of the cavity remains intact as it is decreased. The result is the battery part in the battery part mold cavity have non-disturbed faces when the battery part mold cavity is brought to a closed condition. If intensification is desired one maintains the pressure on the lead as it solidifies so that upon solidification the part is substantially free of tears and cracks as well as surface irregularities.

BRIEF DESCRIPTION OF THE DRAWINGS

FIG. 4 shows an isolated view of the multiple mold surfaces that coact to form a battery part mold cavity wherein moving an end face of the mold cavity contracts the volume of the cavity;

FIG. 5 shows an isolated view of the mold faces with the mold cavity in an open condition to allow flow of molten lead therein;

FIG. 6 is an isolated view of the mold faces of FIG. 5 with the end face in a sealing condition or closed mold condition; and FIG. 7 is an isolated view of the mold faces of FIG. 5 with the mold cavity in a contracted condition.

DESCRIPTION OF THE PREFERRED EMBODIMENT

Figure 1:
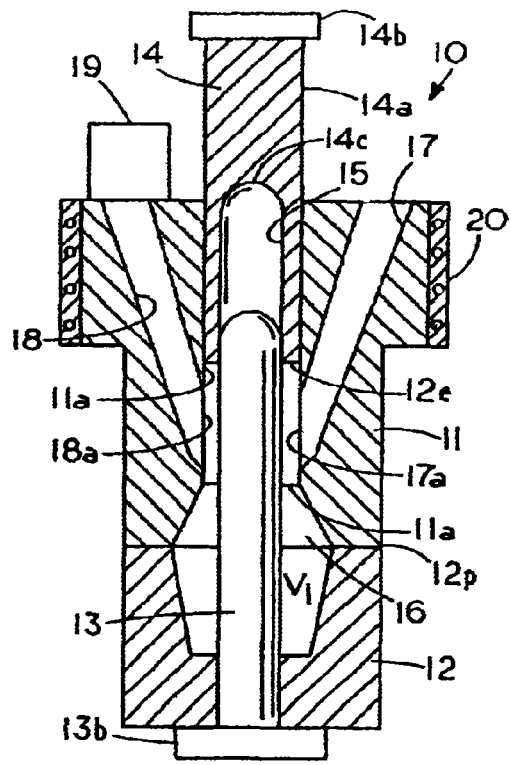
FIG. 1 is a partial sectional view of the apparatus of the mold and extendible pistons for forming a battery part in an open condition.

FIG. 1 is a partial sectional view of apparatus 10 for face intensification during die casting of battery parts. Apparatus 10 includes an upper first mold part 11 and a lower second mold part 12 that are held proximate each other by a member (not shown) to form a cavity 16 therein. The two parts are joined a parting surface 12p that extends between the two mold parts.

Located partially in mold part 11 is a first extendible cylindrical piston 14 which is axially slideable into mold part 11. Piston 14 includes a cylindrical surface 14a for slidingly engaging cylindrical surface 11a in mold part 11 to prevent molten lead from flowing therepast. The end of piston 14 includes a hemispherical recess 14c and an annular impact surface 12e there around with the annular impact surface 12e located in a single plane. Extendible piston 14 slidingly engages the sidewall 11a of mold part 11 to allow for axial insertion thereof to bring the impact surface 12e downward to become a portion of the battery part cavity surfaces formed by the sidewalls of cavity 16. That is, the impact surface 12e forms an entire end or side-to-side top surface to the battery part cavity 16 thereby preventing formation of local irregularities in the end surface of a battery part cast since the entire end face 12e can be brought inward to form the battery part mold cavity.

Extending downward into mold part 11 is a first runner or gate 17 terminating in a mouth 17a and a second runner 18 or vent terminating in a mouth 18a. Runner 17 is connected to a supply of molten lead (not shown) and vent 18 connects to a vent valve 18 to allow air to escape from the mold cavity. Located around the mold part 11 is a heater 20 for maintaining the temperature of the upper portion of mold part 11 sufficiently hot to maintain the lead in runners 17 and 18 in a molten state during the intensification and casting of a battery part.

Located beneath mold part 12 is a cylindrical pin 13 for that extends through cavity 16 and into a cylindrical sleeve 15 in piston 14. Pin 13 has a cylindrical surface 13 that slidingly engages cylindrical sleeve 15 to maintain a sliding relationship between piston 14 and pin 13.

Figure 2:
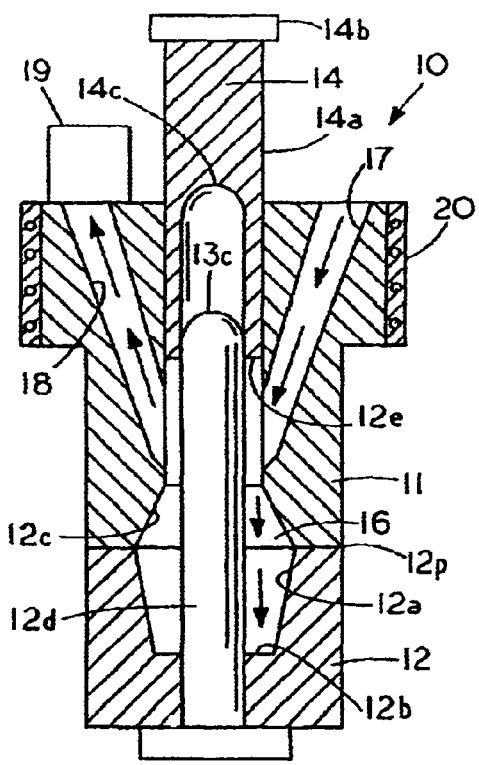
FIG. 2 is partial sectional view of the apparatus of FIG. 1 showing one of the extendible pistons extended to form part of an interior surface for a battery part and the other extendible piston in a retracted condition to allow molten lead to flow into the mold.

FIG. 2 is partial sectional view of the apparatus of FIG. 1 showing the pin 13 extended upward into battery part cavity 16 to form part of an interior surface for a battery part. The top extendible piston 14 is in a retracted condition to allow molten lead to flow into the mold cavity 16 through the runners 17 and excess lead and air to evacuate through runner 18, as indicated by the arrows. Thus as evident by FIG. 2 the molten lead flows around the extendible piston 13 into the annular battery part cavity 16. Note, at this point end annular surface 12e forms no part of the contiguous boundary wall of the battery part cavity 16. That is the mold cavity is in an open condition so that molten lead can flow into cavity 16 thought gate 17.

While the present battery part cavity is shown with an annular shaped battery part cavity one can use the present process without a pin 13 to obtain a non-annular shaped battery part.

Figure 3:
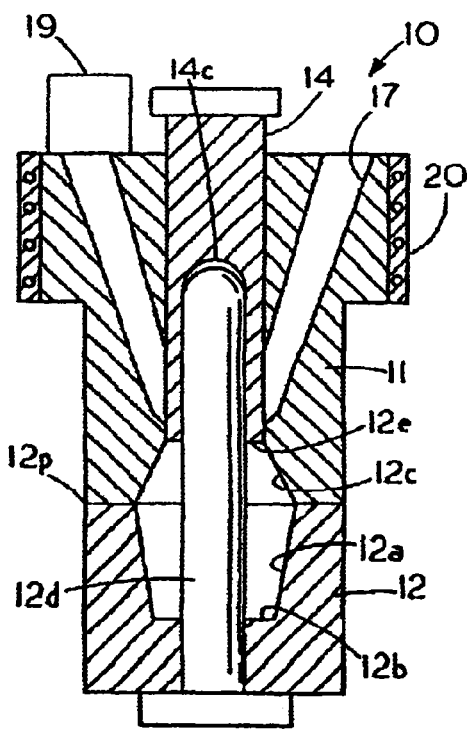
FIG. 3 is the partial sectional view of the apparatus of FIG. 1 showing the extendible piston in an engaged condition that prevents further molten lead to from flowing into the battery part cavity and at the same time intensifying the lead in the battery part cavity.

FIG. 3 is the partial sectional view of the apparatus of FIG. 1 showing the extendible piston 14 in an engaged or closed condition that prevents further molten lead from flowing into or out of the battery part cavity 16 and at the same time in a condition that one can intensifies the lead in the battery part cavity 16 to inhibit the formation of tears and cracks. In the position shown, the sidewalls 14a of piston 14 close off the mouths 17a and 18a to prevent further molten lead from flowing into or out of battery part cavity 16. Molten lead 30 is shown in battery part cavity 16 as well as in runners 17 and 18.

During the extension of member 14 excess molten lead in chamber 31 is forced backward or backwashed into runners 17 and 18 until the end of extendible piston covers the mouths 17a and 18a of the runners 17 and 18. This ensures that the mold cavity is filled with molten lead. At this point battery part cavity 16 becomes closed as no lead can leave the battery part cavity. Further downward pressure on extendible piston 14 brings end face 12e downward decreasing the volume of the battery part cavity without penetration of a surface. By maintaining the pressure one intensifies the cast part by increasing the internal pressure of the lead in the battery part cavity 16 sufficiently high so that when the lead solidifies the part is substantially free of tears and cracks. Thus, the intensification process of the present method comprises creating an abrupt increase in the internal pressure of the lead in a mold cavity to a level which is sufficient to reduce the size of trapped air bubbles therein by bringing an entire face of the battery part mold cavity toward the other mold faces so that when the battery part solidifies the battery part is substantially free of cracks and tears.

In the embodiment shown the annular end 12e of the extendible piston 14 is driven to an adjoining condition at the corner line of the cavity of the battery part cavity surface 16 in mold part 11. By having the impact surface 12e form the entire bounded top surface of the battery part cavity one eliminates the formation of irregularities in the finished battery parts since the top surface of the battery part cavity remains a continuous surface.

FIG. 3 shows that the battery part cavity is formed of multiple surfaces or faces some of which are formed by the extendible piston and others that are formed by the mold parts. That is, the battery part cavity has an interior surface 12d formed by piston 13. Mold part 12 includes annular mold part surface 12b and lateral mold part surface 12a. Mold part 11 includes the lateral mold part surface 12c with impact surface 12e defining the final surface portion of the battery part.

As can be seen pin 13 slidingly mates with the cylindrical recess 14c in piston 14 thus ensuring that both pin 13 and piston 14 are in axial alignment and that the interior surface of the cast part is centrally positioned within the battery cavity 16.

With the present apparatus and method one eliminates any runner marks as well as intensification marks on the finished battery part since the battery part is contiguously defined by the coactions of the extendible pistons and the battery part molds. In addition, the alignment of the extendible pistons allows for an on-the-go formation of the battery cavity.

In the present process the method of die casting a finished battery part while minimize cracks and voids in the battery part includes the steps of forming a mold 11, 12 with the mold defining a plurality of faces 12a, 12b, 12c 12f for a first portion of a battery part mold cavity 16. One forming a gate passage 17 that fluidly connected to the first portion of the battery part mold cavity 16 when the mold is in a pouring condition. One forms a moveable member or piston 14 the moveable member includes a portion 12e defining a further face of the battery part mold cavity 16 with the plurality of faces 12a, 12b, 12c 12f and the further face 12e defined a surface bounded mold cavity when the moveable member is in a closed condition as illustrated in FIG. 3. By pouring a lead containing metal in a fluid state into the gate 17 of the mold when the mold cavity 16 is in an open condition as illustrated in FIG. 2 allows molten lead to flow into the mold cavity 16. By allowing the lead containing metal to fill the first portion of the battery part mold cavity 16 of volume $V_1$ (FIG. 4); and then driving the moveable member 14 toward the first portion the battery mold part one closes off the gate passageway 17 and the vent passage 18. One continues to drive the movable member 14 toward the first portion of the battery mold part cavity 16 until the further face 12e forms the final surface to close the mold cavity 16. By applying pressure to member 14 one can increase the internal pressure of the lead in the mold increases sufficiently to force lead into any solidification voids formed in the batter part. Next, one allows the battery part to solidify under pressure. Once the battery part is solidify one can removing the mold from the battery part to produce a finished battery part.

The method of forming a finished battery part can be obtained by pouring a lead containing metal in a liquid state into an open battery cavity 16 defined by a first set of faces in a battery part mold and allowing the lead containing metal to solidify around the first set of faces in the battery part mold and then driving a member having a portion defining a completion face 12e toward open battery cavity 16 until the completion face 12e and the first set of faces coact to form a closed surface for the battery cavity. By maintaining pressure on the batter part therein during solidification of the metal in a liquid state it forces molten lead to flow into any solidification voids formed during solidification phase of the molten lead in the battery part cavity.

FIG. 4 illustrate the set of faces for forming the die cast battery part. For ease in comprehension the mold parts have been left out with exception of the faces that form the mold cavity. That is the set of mold faces comprises a cylindrical interior face 12c, a lower end face 12b, a lower side face 12a, an upper side face 12c, a cylindrical end face 12f and a top end face 12e. These set of faces form the boundary surfaces for defining the battery part which is die cast with the present invention. The surfaces defined by the set of faces have a volume designated by $V_1$. It is within the volume $V_1$ that the finished battery part would solidify into a battery part with minimum cracks and tears.

In order to illustrate the volume of the battery part mold cavity $V_2$ in the unreduced state dashed lines have been included to illustrate the position of the gate 17 for supplying molten lead to the cavity as well as the vent 18 for discharging air and excess lead. The annular surface identified as 12e' identifies the position of the mold when the mold is in an open condition and the annular surface 12e identified the boundary of the mold cavity 16 in closed condition but not yet in a pressurized condition. V identifies the contracted volume$_1$. Thus the end annular face 12e can be brought downward to decrease the first volume $V_2$ of the battery part cavity by forcing the annular mold face 12e toward the battery part cavity 16 while the molten lead in the battery part cavity is at least partially in an unsolidified state. By maintaining the battery part cavity 16 in a decreased volume during a solidification of a battery part one inhibits the formation of cracks and tears in a die cast battery part.

Thus the method of die casting a battery part comprises injecting a lead containing metal in a molten state into an open battery part cavity 16 which is partially defined by a mold 11 and 12. By closing the battery part cavity 16 by bringing a member 14 with a finished mold face 12e toward the open battery part cavity 16 partially defined by the mold 11 and 12 one shuts of the passage ways 17 and 18 to create a closed battery part cavity 16 to thereby prevent further lead containing metal in a molten state from entering or leaving the closed battery part cavity 16. By increasing the pressure of the lead in the closed battery part cavity 16 one can force lead that is in a molten state in the battery part cavity into any solidification voids in lead in the closed battery part cavity 16 to thereby inhibit the formation tears and cracks in the batter part.

The present method can include the step of maintaining the mold faces at a temperature below the solidification temperature of the molten lead to cause peripheral surface solidification. By allowing peripheral surface solidification to occur before the volume contraction occurs one can force the molten lead into voids and cracks in the peripheral surface solidification thereby inhibiting the formation of solidification voids in the die cast part.

Thus with the present process one can form an unfinished die cast battery part with the die cast battery part having a set of bounded faces with each of said set of bounded faces adjoining each other to defining a closed surface for the battery part. Each of faces 12a, 12b, 12c, 12f and 12e are characterized by having a continuous bounded surface free of surface imperfections so that a battery part formed within the cavity is also free of surface imperfection when the die cast battery part is removed from a die cast mold.

FIG. 5, FIG. 6 and FIG. 7 illustrate the various conditions of the cavity during the process of solidification.

FIG. 5 shows the mold in the open condition with the set of mold faces 12a, 12b, 12c 12d and 12f forming the lower battery part mold cavity. This state is referred to as an open mold cavity since molten lead can enter the mold cavity through the open annular top of mold cavity 16. In this condition the mold part cavity 16 can be filled with molten metal.

FIG. 6 shows the mold in the closed condition with the set of mold faces 12a, 12b, 12c 12d and 12f forming the lower battery part mold cavity and annular face 12e forming the top face of mold cavity 16. This state is referred to as a closed mold cavity since molten lead cannot enter or leave the mold cavity 16. In this condition the mold part cavity 16 forms a bounded or confined region for the molten metal. Note in this condition the downward movement of piston 14 has sealed off both the inlet and outlet to the mold cavity 16. Extending laterally outward is a cavity closing line $S_L$ that identifies the point wherein the sidewalls of piston 14 close off both the inlet and outlet for metal to the cavity 16.

FIG. 7 shows the next phase wherein piston 14 has been extended beyond the cavity closing line $S_L$ a distance x. Note, the entire face 12e has been moved toward the mold cavity 16 to decrease the volume of the mold cavity 16. This is the contracted condition wherein the pressure of the molten lead has been increased sufficiently so that it inhibits the formation of tears and cracks in the solidified metal. FIG. 7 illustrates that the entire face 12e moves downward along sidewall 12f to not only reduce the volume of cavity 16 but to reduce the peripheral surface area of the faces forming the cavity 16. In addition, since the entire face 12e moves toward the cavity 16 to contract the volume of the cavity the solidifying battery part surfaces are not disturbed. This results in a die cast product that, when removed from the mold, has a finished surface condition, thus eliminating the need for an extra step of finishing the product.

I claim:

1. A mold for forming a battery component having an interior surface and an exterior surface, the exterior surface including a side portion extending between first and second end portions, the mold comprising:
   a cavity having a first end face and a lateral face, wherein the first end face is configured to define the first end portion of the exterior surface of the battery component, and the lateral face is configured to define the side portion of the exterior surface of the battery component;
   a pin positioned in the cavity, wherein the pin includes a pin face defining the interior surface of the battery component; and
   a movable second end face that reduces a volume of the cavity, wherein the second end face receives at least a portion of the pin and defines the second end portion of the exterior surface of the battery component when the second end face reduces the volume of the cavity.

2. The mold of claim 1 wherein the second end face is at least generally annular and is carried by a piston that slidably contacts with the mold to move the second end face toward the cavity.

3. The mold of claim 1 wherein the second end face is carried by a piston that slidably contacts the pin and a sidewall portion of the mold to seal the cavity when the second end face reduces the volume of the cavity.

4. The mold of claim 1 wherein the pin has a generally cylindrical shape and the second end face is carried by a piston that includes a recess that corresponds to the cylindrical shape of the pin, wherein the pin is at least partially inserted into the recess when the second end face reduces the volume of the cavity.

5. The mold of claim 1 wherein the pin is removably positioned in the cavity and wherein the second end face is movable relative to the pin.

6. The mold of claim 1, further comprising a first gate opening in fluid communication with the cavity for introducing a flowable material into the cavity, and a second gate opening for venting the cavity, and wherein the second end face is carried by a piston that seals the first and second gate openings when the second end face reduces the volume of the cavity.

7. The mold of claim 1 wherein the first end face, the lateral face, the pin face, and the second end face form a smooth finished surface of the entire battery component such that the exterior surface and the interior surface of the battery component are substantially defect free.

8. The mold of claim 1 wherein the mold is configured to solidify the battery part in the cavity under pressure after the second end face reduces the volume of the cavity.

9. A mold for forming a battery part, the mold comprising:
   a cavity configured to receive a flowable material;
   a pin extending through at least a portion of the cavity; and
   a piston operably coupled to the mold, wherein the piston has an end face and wherein the piston is movable between a first position and a second position, wherein at the first position an end face of the piston is spaced apart from the cavity, and at the second position the end face receives at least a portion of the pin and seals the cavity.

10. The mold of claim 9 wherein the end face of the piston is an annular end face with an opening therein that receives the pin when the piston moves from the first position to the second position.

11. The mold of claim 9 wherein the end face of the piston reduces a volume of the cavity when the piston moves from the first position to the second position.

12. The mold of claim 9 wherein the pin has an at least generally cylindrical shape with a dome-shaped end portion, and wherein the piston includes a recess with a hemispherical end portion that is configured to receive the pin and corresponding dome-shaped end portion when the piston moves from the first position to the second position.

13. The mold of claim 9 wherein the end face of the piston simultaneously seals the cavity and increases a pressure of the cavity when the piston moves from the first position to the second position.

14. The mold of claim 9 wherein the pin is removably coupled to the mold, and wherein the piston is movable relative to the pin.

15. The mold of claim 9 wherein the mold includes a first gate opening configured for introducing the flowable material into the cavity, and a second gate opening configured for venting the cavity, and wherein the piston closes the first and second gate openings when the piston moves from the first position to the second position.

16. The mold of claim 9 wherein the mold includes a first mold part and a second mold part coupled to the first mold part, and wherein the first and second mold parts define the cavity.

17. A mold for forming a battery terminal, the mold comprising:

a cavity configured to receive a flowable material;

a pin extending through at least a portion of the cavity; and means for reducing a volume of the cavity while the pin remains at least generally stationary in the cavity.

18. The mold of claim 17 wherein the means for reducing the volume of the cavity include a movable piston that slidably engages the pin and seals the cavity when the movable piston moves toward the cavity to reduce the volume of the cavity.

19. The mold of claim 17 wherein the means for reducing the volume of the cavity include a movable piston having an end face that receives at least a portion of the pin when the piston moves toward the pin to reduce the volume of the cavity, and wherein the end face seals the cavity when the piston moves toward the pin.

20. The mold of claim 17, further comprising:

means for introducing the flowable material into the cavity; and means for venting the cavity.

21. The battery terminal of claim 17 wherein:

the means for introducing the battery terminal include a first gate opening in fluid communication with the cavity;

the means for venting the cavity include a second gate opening in fluid communication with the cavity; and the means for reducing the volume of the cavity include a movable piston that closes the first and second gate openings when the piston reduces the volume of the cavity.

* * * * *